US006560682B1

(12) United States Patent
Miller et al.

(10) Patent No.: US 6,560,682 B1
(45) Date of Patent: *May 6, 2003

(54) SYSTEM AND METHOD FOR TERMINATING LOCK-STEP SEQUENCES IN A MULTIPROCESSOR SYSTEM

(75) Inventors: Robert J. Miller, Columbia, SC (US); Edward A. McDonald, Baton Rouge, LA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,676

(22) Filed: Oct. 3, 1997

(51) Int. Cl.[7] .......................... G06F 12/00; G06F 13/00
(52) U.S. Cl. .......................... 711/152; 711/118; 711/151
(58) Field of Search ................ 711/3, 118, 152, 711/154, 163, 200; 395/726; 710/200

(56) References Cited

U.S. PATENT DOCUMENTS

| | | | | |
|---|---|---|---|---|
| 4,151,593 A | * | 4/1979 | Jenkins et al. | 711/152 |
| 4,405,898 A | | 9/1983 | Flemming | 328/72 |
| 4,470,112 A | | 9/1984 | Dimmick | 364/200 |
| 4,494,193 A | * | 1/1985 | Brahm et al. | 709/225 |
| 4,751,727 A | * | 6/1988 | Brahm et al. | 379/28 |
| 4,937,733 A | * | 6/1990 | Gillett, Jr. et al. | 710/108 |
| 5,006,980 A | * | 4/1991 | Sanders et al. | 712/219 |
| 5,016,167 A | * | 5/1991 | Nguyen et al. | 711/151 |
| 5,025,370 A | * | 6/1991 | Koegel et al. | 710/241 |
| 5,133,074 A | * | 7/1992 | Chou | 711/146 |
| 5,416,434 A | | 5/1995 | Kootstra et al. | 327/113 |
| 5,430,848 A | | 7/1995 | Waggener | 395/325 |
| 5,551,027 A | * | 8/1996 | Choy et al. | 395/600 |
| 5,553,248 A | * | 9/1996 | Melo et al. | 710/116 |
| 5,553,276 A | | 9/1996 | Dean | 395/550 |
| 5,590,335 A | * | 12/1996 | Dubourreau et al. | 395/704 |
| 5,592,633 A | | 1/1997 | Casis et al. | 395/309 |
| 5,603,017 A | | 2/1997 | Intrater et al. | 395/556 |
| 5,615,373 A | * | 3/1997 | Ho | 395/726 |
| 5,669,002 A | * | 9/1997 | Buch | 395/726 |
| 5,678,026 A | * | 10/1997 | Vartti et al. | 711/152 |
| 5,682,537 A | * | 10/1997 | Davies et al. | 710/200 |
| 5,706,446 A | * | 1/1998 | Kalish et al. | 710/113 |
| 5,761,454 A | * | 6/1998 | Adusumilli et al. | 710/126 |

* cited by examiner

Primary Examiner—Tuan V. Thai
(74) Attorney, Agent, or Firm—Blakley, Sokoloff, Taylor & Zafman LLP

(57) ABSTRACT

There is provided, for use in a processing system containing a plurality of processors coupled to a main memory, a control circuit for perturbing a lock-step sequence of memory requests received from the processors. The control circuit comprises a memory request generator for generating at least one memory request operable to terminate the lock-step sequence of memory requests.

19 Claims, 3 Drawing Sheets

SYSTEM AND METHOD FOR TERMINATING LOCK-STEP SEQUENCES IN A MULTIPROCESSOR SYSTEM

CROSS-REFERENCE TO RELATED PATENT APPLICATIONS

The present invention is related to that disclosed in U.S. patent application Ser. No. 08/760,126, filed Dec. 3, 1996, entitled "COMPUTER SYSTEM INCLUDING MULTIPLE SNOOPED, MULTIPLE MASTERED SYSTEM BUSSES AND METHOD FOR INTERCONNECTING SAID BUSSES." U.S. patent application Ser. No. 08/760,126 is commonly assigned to the assignee of the invention disclosed in this patent document and is incorporated herein by reference for all purposes as if fully set forth herein.

TECHNICAL FIELD OF THE INVENTION

The present invention is directed, in general, to multiprocessor systems and, more specifically, to a system and method for disrupting a lock-step sequence condition in a server containing multiple processor units.

BACKGROUND OF THE INVENTION

Increasingly, state-of-the-art computer applications implement high-end tasks that require multiple processors for efficient execution. Multiprocessor systems allow parallel execution of multiple tasks on two or more central processor units ("CPUs"). A typical multiprocessor system may be, for example, a network server. Preferably, a multiprocessor system is built using widely available commodity components, such as the Intel Pentium®Pro processor (also called the "P6" processor), PCI I/O chipsets, Pentium®Pro processor bus topology, and standard memory modules, such as SIMMs and DIMMs. There are numerous well-known multiprocessor system architectures, including symmetrical multiprocessing ("SMP"), non-uniform memory access ("NUMA"), cache-coherent NUMA ("CC-NUMA"), clustered computing, and massively parallel processing ("MPP").

A symmetrical multiprocessing ("SMP") system contains two or more identical processors that independently process as "peers" (i.e., no master/slave processing). Each of the processors (or CPUs) in an SMP system has equal access to the resources of the system, including memory access. A NUMA system contains two or more equal processors that have unequal access to memory. NUMA encompasses several different architectures that can be grouped together because of their non-uniform memory access latency, including replicated memory cluster ("RMC"), MPP, and CC-NUMA. In a NUMA system, memory is usually divided into local memories, which are placed close to processors, and remote memories, which are not close to a processor or processor cluster. Shared memories may be allocated into one of the local memories or distributed between two or more local memories. In a CC-NUMA system, multiple processors in a single node share a single memory and cache coherency is maintained using hardware techniques. Unlike an SMP node, however, a CC-NUMA system uses a directory-based coherency scheme, rather than a snoopy bus, to maintain coherency across all of the processors. RMC and MPP have multiple nodes or clusters and maintain coherency through software techniques. RMC and MPP may be described as NUMA architectures because of the unequal memory latencies associated with software coherency between nodes.

All of the above-described multiprocessor architectures require some type of cache coherence apparatus, whether implemented in hardware or in software. High speed CPUs, such as the Pentium®Pro processor, utilize an internal cache and, typically, an external cache to maximize the CPU efficiency. Because a SMP system usually operates only one copy of the operating system, the interoperation of the CPUs and memory must maintain data coherency. In this context, coherency means that, at any one time, there is but a single valid value for each datum. It is therefore necessary to maintain coherency between the CPU caches and main memory.

One popular coherency technique uses a "snoopy bus." Each processor maintains its own local cache and "snoops" on the bus to look for read and write operations between other processors and main memory that may affect the contents of its own cache. If a first processor attempts to access a datum in main memory that a second processor has modified and is holding in its cache, the second processor will interrupt the memory access of the first processor and write the contents of its cache into memory. Then, all other snooping processors on the bus, including the first processor, will see the write operation occur on the bus and update their cache state information to maintain coherency.

Another popular coherency technique is "directory-based cache coherency." Directory-based caching keeps a record of the state and location of every block of data in main memory. For every shareable memory address line, there is a "presence" bit for each coherent processor cache in the system. Whenever a processor requests a line of data from memory for its cache, the presence bit for that cache in that memory line is set. Whenever one of the processors attempts to write to that memory line, the presence bits are used to invalidate the cache lines of all the caches that previously used that memory line. All of the presence bits for the memory line are then reset and the specific presence bit is set for the processor that is writing to the memory line. Therefore, all of the processors do not have to reside on a common snoop bus because the directory maintains coherency for the individual processors.

From the foregoing description, it can be seen that from time to time, two or more processors will attempt to access data from the same location at the same time. In the normal operation of a multiprocessor system, this may result in one or more processors being "retried." That is, a processor performs a memory access to a certain memory location and the memory access is denied because the memory location is temporarily unavailable. When this occurs, the processor retries the memory access within a very short period of time and usually succeeds in accessing the memory location during the retry.

It is known, however, that two or more processors may occasionally get trapped in an endlessly repeating cycle of retries that fails to ever access the desired memory location. This condition may be referred to as a "lock step sequence." The circumstances leading to a lock step sequence are complex and proving that a multiprocessor design is not susceptible to a lock step condition is difficult due to the design complexity and the number of possible states in the system. In its essentials, a lock step sequence may be recognized as a group of CPUs trying to access a line of data in memory that has been locked out by another CPU that has control over that line. Each of the locked out CPUs retries the line and fails, thereby causing another retry to be scheduled. The sequencing of the retries by the CPUs is such that the CPU that has actual control over the line is prevented from unlocking the line because the memory controller is always busy servicing the retry requests of the locked out CPUs.

In this situation, a great deal of bus traffic appears to be occurring, but no actual work is being accomplished by many, if not all, of the CPUs. The applications being run by the multiprocessor system are instead "frozen" in place. As noted before, this condition is difficult to reproduce and correct due to the complexity of the timing of memory requests that cause the condition. The result is that many types of multiprocessor systems will from time to time lock up and require operator intervention to clear the condition. This causes much frustration and reduces the overall processing efficiency of the system.

Therefore, there is a need in the art for improved multiprocessor systems that can more effectively avoid intermittent frozen states that result from lock step sequences among two or more processors. In particular there is a need in the art for systems, circuits, and methods that are able to clear a lock step condition within a relatively short time period and without the need for operator intervention.

SUMMARY OF THE INVENTION

The lock-step sequence problems inherent in the prior art are overcome by the present invention. In one embodiment of the present invention, a control circuit is provided for use in a processing system containing a plurality of processors coupled to a main memory by a first common bus, wherein the control circuit perturbs a lock-step sequence of memory requests received from the processors. The control circuit comprises a memory request generator, adapted to be coupled to the first common bus, for generating at least one memory request operable to terminate the lock-step sequence of memory requests.

In one embodiment of the present invention, the at least one memory request is generated pseudo-randomly. In another embodiment of the present invention, a duration of the at least one memory request is generated pseudo-randomly. In yet another embodiment, such a memory request, or a duration of such memory request, is generated other than pseudo-randomly.

In other embodiments of the present invention, wherein the processing system further comprises a plurality of I/O devices coupled to the main memory by a second common bus, the memory request generator is adapted to be coupled to the second common bus and further generates at least one memory request on the second common bus operable to terminate a second lock-step sequence of memory requests received from the I/O devices.

In still other embodiments of the present invention, the at least one memory request on the second common bus is generated pseudo-randomly. In further embodiments of the present invention, a duration of the at least one memory request on the second common bus is generated pseudo-randomly. Again, such a memory request, or a duration of such memory request, may also be generated other than pseudo-randomly.

In alternate embodiments of the present invention, the at least one memory request on the first common bus and the at least one memory request on the second common bus are generated simultaneously. In still other embodiments of the present invention, the at least one memory request on the first common bus and the at least one memory request on the second common bus are generated at different times.

The foregoing has outlined rather broadly the features and technical advantages of the present invention so that those skilled in the art may better understand the detailed description of the invention that follows. Additional features and advantages of the invention will be described hereinafter that form the subject of the claims of the invention. For instance, the foregoing functionality may certainly be implemented in software, hardware, firmware, or some suitable combination of at least two of the same. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects/things, and in which.

DETAILED DESCRIPTION

Although the text that follows describes the present invention in a symmetric multiprocessing system, it should be clearly understood that this is by way of illustration only. Those skilled in the art will understand that the principles of the present invention may readily be incorporated in a wide variety of multiprocessor systems, including but not limited to NUMA, RMC, CC-NUMA, MPP, and other like systems, in order to clear lock step conditions. Additionally, the phrase "associated with" and derivatives thereof, as used herein, may mean to include, be included within, interconnect with, contain, be contained within, connect to or with, couple to or with, be communicable with, cooperate with, interleave, be a property of, be bound to or with, have, have a property of, or the like.

Figure 1:
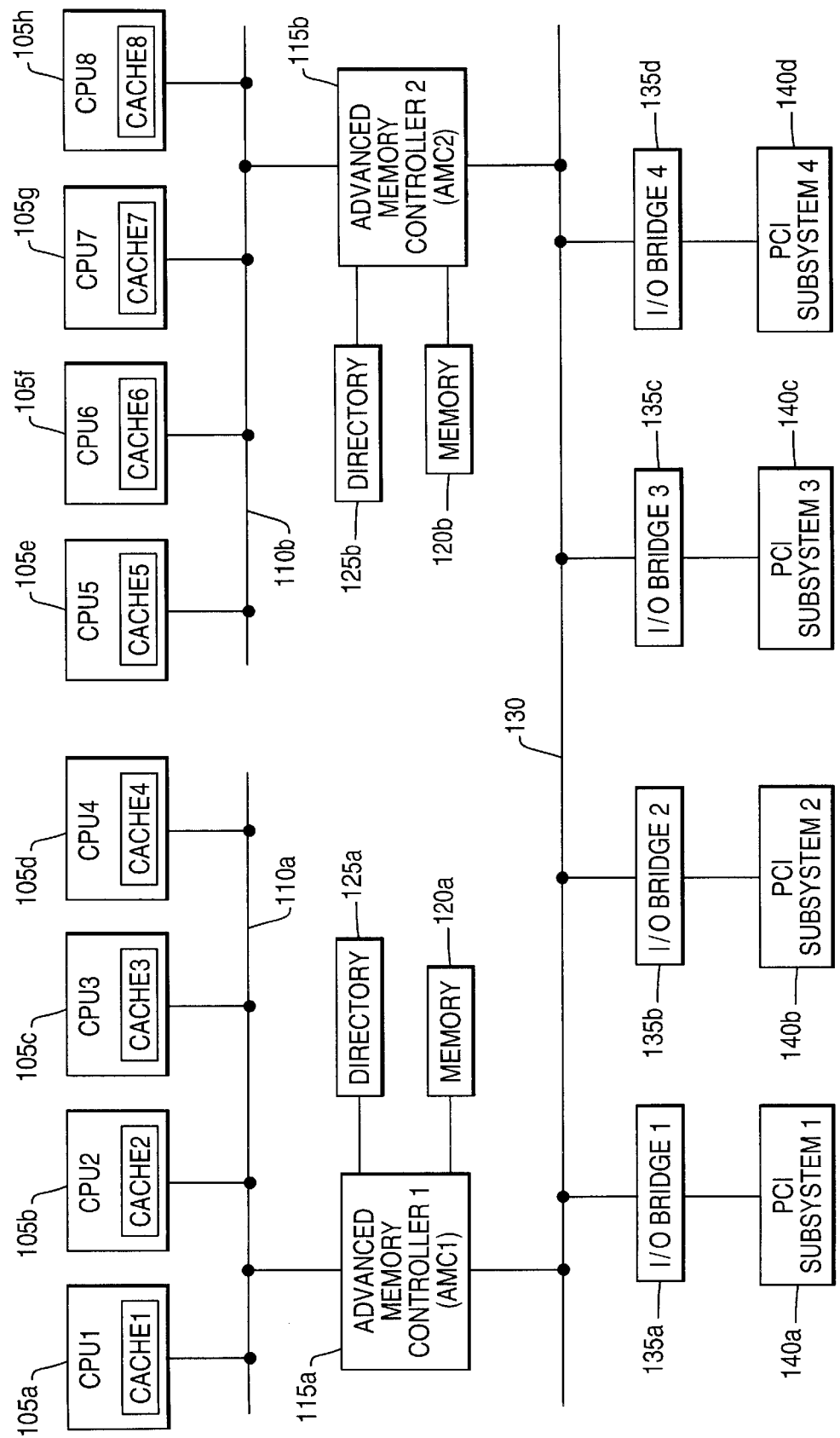
FIG. 1 is a block diagram of an exemplary eight processor standard high volume ("SHV") symmetric multiprocessing ("SMP") computer system employing a pair of advanced memory controllers in accordance with one embodiment of the present invention.

Turning initially to FIG. 1, illustrated is a block diagram of an exemplary eight processor standard high volume ("SHV") symmetric multiprocessing ("SMP") system (generally designated 100) employing a pair of advanced memory controllers 115 in accordance with one embodiment of the present invention. SMP system 100 contains two separate processor building blocks. A first building block comprises processors 105a–105d (hereafter, "CPU1" through "CPU4"), advanced memory controller 115a (hereafter, "AMC1"), memory 120a and directory 125a. A second building block comprises processors 105e–105h (hereafter, "CPU5" through "CPU8"), advanced memory controller 115b (hereafter, "AMC2"), memory 120b and directory 125b. The two building-blocks are interconnected by a common I/O bus 130.

Within the first building block, CPU1 through CPU4 are coupled to AMC1 by CPU bus 110a. Within the second building block, CPU5 through CPU8 are coupled to AMC2 by CPU bus 100b. In one embodiment of the present invention, CPU bus 110 is high-bandwidth split-transaction bus coupled to one port of the AMC. The second port of the AMC is coupled to I/O bus 130. I/O bus 130 is coupled to four PCI subsystems 140a through 140d (hereafter, "PCI Subsystem 1" through "PCI Subsystem 4") by means of I/O bridges 135a–135d (hereafter, I/O Bridge 1 through I/O Bridge 4). AMC 1 and AMC 2 control access to memory 120a and memory 120b, respectively. In one embodiment of the present invention, memory 120a and memory 120b are DRAM arrays in which coherency is maintained by use of protocols and a directory.

SMP system 100 implements a hybrid cache coherency scheme to keep track of data moving between and among the various CPU caches, memories 120a and 120b, and CPU 1 through CPU 8. CPU1 through CPU4 contain cache memories (hereafter, "Cache 1 through Cache 4," respectively). CPU5 through CPU8 contain cache memories (hereafter, "Cache 5 through Cache 8," respectively). The CPU cache memories may be internal or external caches. CPU 1 through CPU 4 may use a bus snooping protocol on CPU bus 110a to maintain coherency with one another and memory 120a. Likewise, CPU 5 through CPU 8 may use a bus snooping protocol on CPU bus 110b to maintain coherency with one another and memory 120b. If a processor needs data that is available and being held "dirty" (i.e, modified) in the cache of another processor, the processors will exchange the data, rather than access the memories 120a and 120b, thereby maintaining coherency between the processors.

Coherency between main memories 120a and 120b and Cache 1 through Cache 8 is maintained by a combination centralized/distributed directory-based cache coherency. Within directories 125a and 125b, a memory line status table ("MLST") identifies which group of processors (i.e., CPU 1 through CPU 4 or CPU 5 through CPU 8) that are coupled by a common bus (i.e., CPU bus 110a or CPU bus 110b) have which lines of memory in their associated cache memories (i.e., Cache 1 through Cache 4 or Cache 5 through Cache 8). When a processor requests data, the status table identifies where the most recent, or current, copy of the data resides. Advantageously, this method of maintaining cache coherency does not require additional work to be performed until a processor needs data that resides in a cache that cannot be accessed through snooping.

In a preferred embodiment of the present invention, all of the components, except for AMC 1 and AMC 2, of SMP system 100 comprise commodity chips, thereby minimizing system costs. For example, CPU 1 through CPU 8 may be Intel Pentium®Pro processors, I/O bus 130 may be comprised of the PCI I/O chipset, and CPU busses 110a and 110b and I/O bus 130 may be implemented using the Pentium®Pro bus topology. A more detailed discussion of the operation of SMP system 100 and, more particularly, AMC 1 and AMC 2, is provided in U.S. patent application Ser. No. 08/760,126, filed Dec. 3, 1996, entitled "COMPUTER SYSTEM INCLUDING MULTIPLE SNOOPED, MULTIPLE MASTERED SYSTEM BUSSES AND METHOD FOR INTERCONNECTING SAID BUSSES," which was previously incorporated herein by reference.

As mentioned above, lock step sequences can occur in multiprocessor systems, such as SMP system 100. This may occur as a result of multiple processors attempting to access memory 120a or memory 120b at the same time. This may also occur as a result of multiple PCI subsystems attempting to access memory 120a or memory 120b at the same time. Lastly, a lock step sequence may occur as a result of a combination of processor and PCI subsystems attempting to access memory 120a or memory 120b at the same time.

The present embodiment overcomes such problems using circuitry that provides pseudo-random high-priority memory requests on either CPU bus 110 or I/O bus 130, or both. The pseudo-random memory request is injected into the lock-step sequences of memory requests that are stalling the CPUs and/or PCI subsystems. In one embodiment of the present invention, the pseudo-random memory requests are created by bus request generators that temporarily stall either CPU bus 110 or I/O bus 130, thereby preventing the CPUs or the I/O subsystem from sending memory requests to the corresponding port of the dual-ported AMC. By perturbing the timing of the CPU memory requests and/or PCI subsystem memory requests, the pseudo-random memory access is sufficient to break the lock-step sequence. The pseudo-random high priority memory requests are of a relatively short and pseudo-random duration, and may be spaced far enough apart so that there is only a minute overhead penalty paid during normal processing when lock-step sequences are not occurring. The present embodiment has only a minimal impact on memory bandwidth because the memory is dual-ported and permits access at a first port when a pseudo-random memory request is active at a second port.

Figure 2:
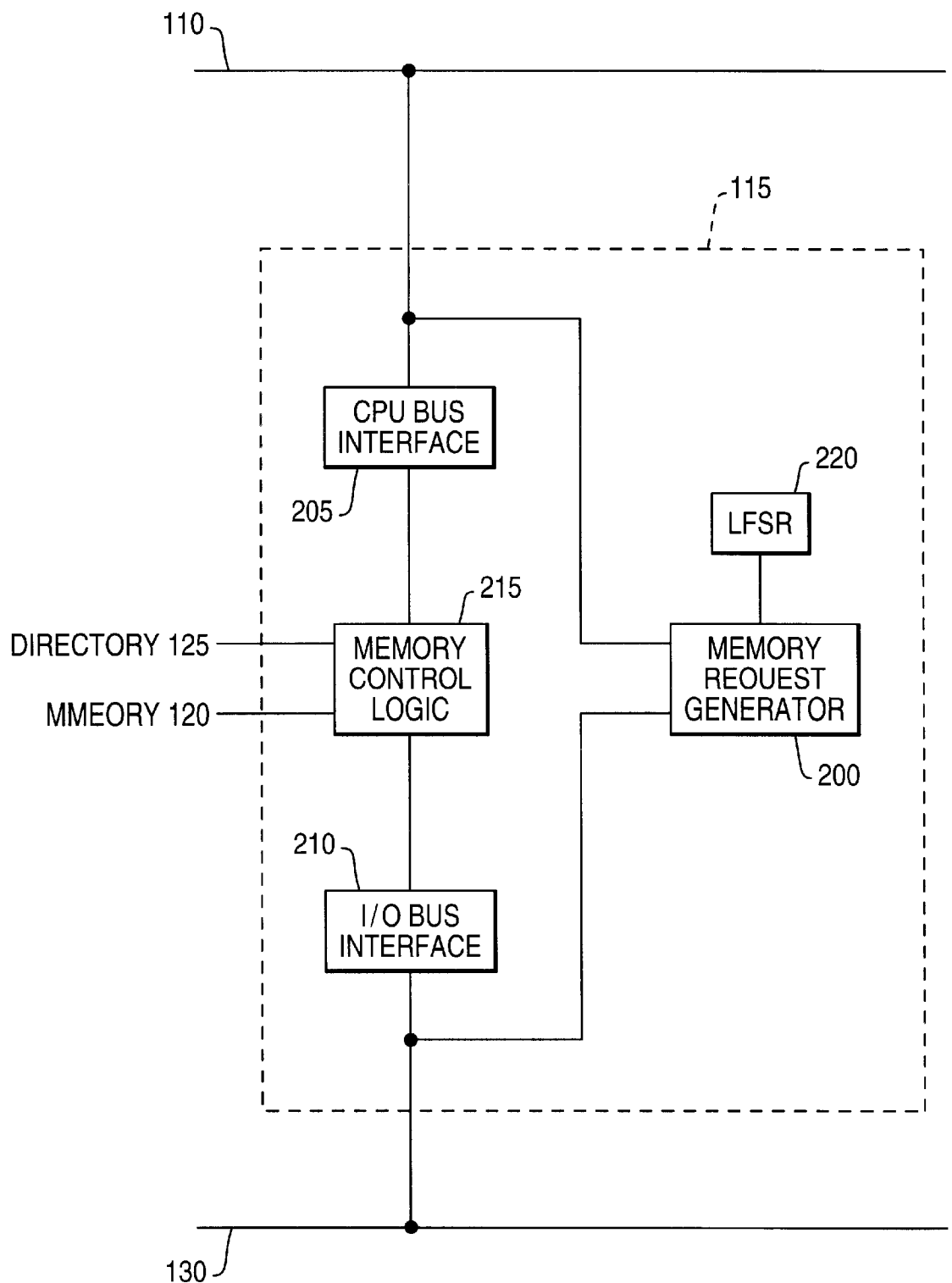
FIG. 2 is a block diagram of an exemplary pseudo-random memory request generator in accordance with one embodiment of the present invention.

Turning now to FIG. 2, illustrated is a block diagram of AMC 115 having an exemplary pseudo-random memory request generator 200 in accordance with one embodiment of the present invention. In addition to memory request generator 200, AMC 115 further comprises a CPU bus interface 205, an I/O bus interface 210 and memory control logic 215. Memory control 215 controls a memory line status table ("MLST") in directory 125 and generates/controls coherency transactions and a dual ported DRAM controller. Memory requests are received from I/O bus 130 and from CPU bus 110 and are directed to the appropriate line in memory 120.

Memory request generator 200 generates high priority memory requests on both CPU bus 110 and I/O bus 130. According to the illustrated embodiment, the high-priority memory requests do not perform any significant action on memory and are intended only to perturb any lock-step sequence that may be occurring when the high-priority memory request is sent onto CPU bus 110 and/or I/O bus 130. These high-priority memory requests are generated pseudo-randomly using an exemplary linear feedback shift register ("LFSR") 220. The timing of LFSR 220 is such that a high-priority memory request is generated in an aperiodic manner only once every several hundred bus cycles up to perhaps many thousands of bus cycles on CPU bus 110 and/or I/O bus 130. The length of each high-priority memory request is also a pseudo-randomly small number of bus cycles (typically, one to sixteen bus cycles). Thus, the high priority memory requests generated by memory request generator 200 account for only a minute portion of the overall bus traffic on CPU bus 110 and I/O bus 130.

Exemplary memory request generator 200 contains control logic that may send high-priority memory requests only to one bus, such as CPU bus 110 only, or both busses. In one embodiment, the high-priority memory requests are sent to both busses simultaneously. In another embodiment, LFSR 220 comprises two separate linear feedback shift registers that generate independent high-priority memory requests on CPU bus 110 and I/O bus 130 using different timing algorithms. Since the high-priority memory requests are independently generated and very infrequent, they rarely occur simultaneously on both ports of the dual-ported memory, thereby minimizing impact on the overall memory bandwidth.

Figure 3:
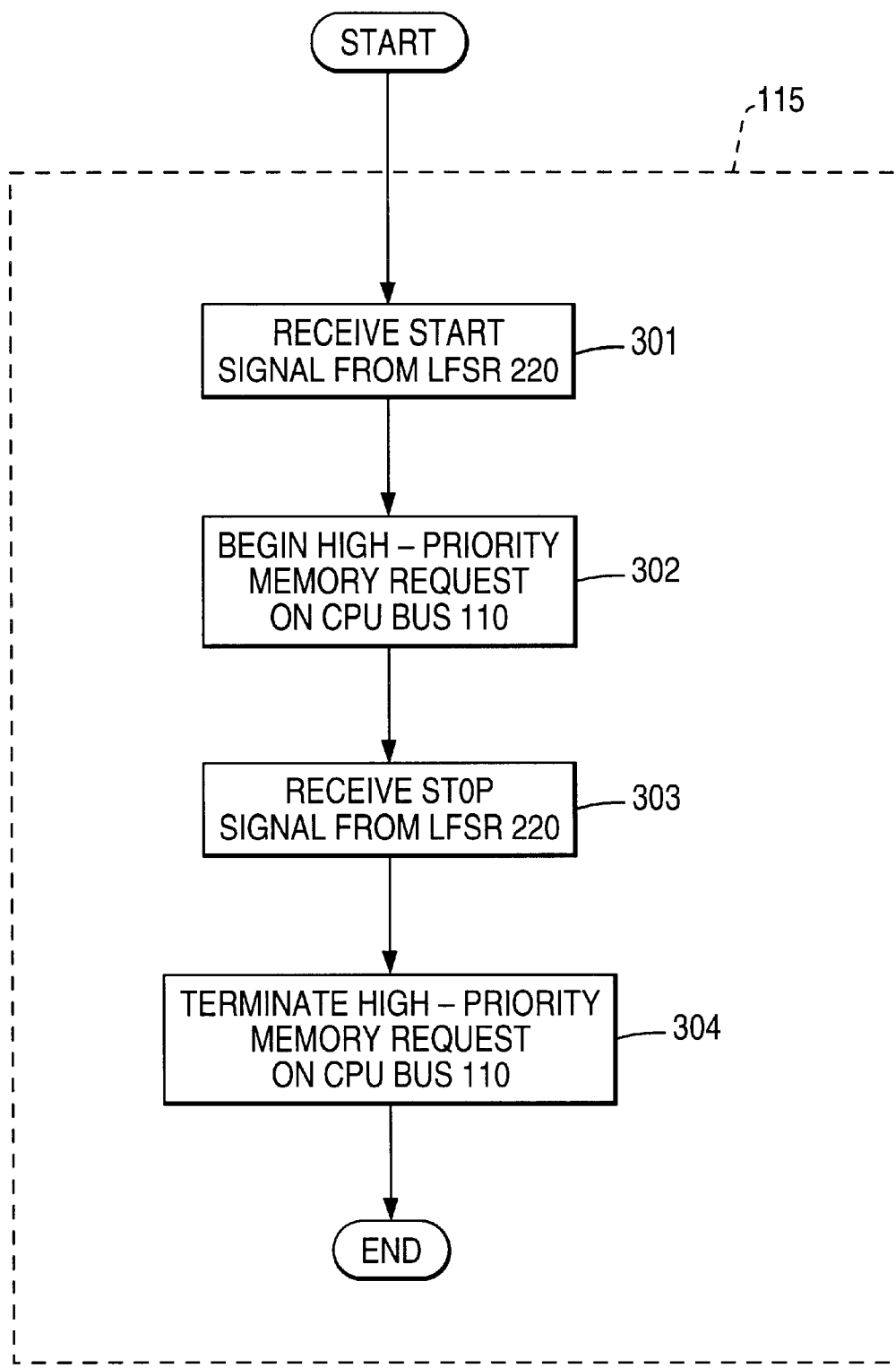
FIG. 3 is a flow diagram depicting and exemplary operation of an advanced memory controller ("AMC") containing a memory request generator in accordance with one embodiment of the present invention.

Turning lastly to FIG. 3, illustrated is a flow diagram depicting the exemplary operation of an advanced memory controller ("AMC") 115 containing a memory request generator 200 in accordance with one embodiment of the present invention. The exemplary operation shows the generation of high-priority memory requests on CPU bus 110. It should be understood that the description of the exemplary embodiment that follows applies with equal force to the generation of high-priority memory requests on I/O bus 130.

The output signals of LFSR 220 essentially comprise START signals and STOP signals that cause memory request generator 200 to initiate and terminate high-priority memory requests on CPU bus 110. In its simplest form, the output of LFSR 220 may be a series of pseudo-randomly spaced pulses having pseudo-random pulse widths (again, for example, one to sixteen clock cycles wide), where the rising edge of each pulse is the START signal and the falling edge of each pulse is the STOP signal.

The memory request generator 200 receives the START signal from LFSR 220, process step 301. The memory request generator 200 then initiates a high-priority memory request on CPU bus 110, process step 302, which consumes bus cycles and prevents the CPUs from sending further memory requests to the corresponding port of the dual-ported AMC 115.

A comparatively short time later, the memory request generator 200 receives the STOP signal from LFSR 220, process step 303. The memory request generator 200 then terminates the active high-priority memory request on CPU bus 110, process step 304. This frees the CPU bus 110 and allows the CPUs to resume sending memory requests to the corresponding port of the dual-ported AMC 115. At this point, the old timing relationship of memory requests generated by the CPUs that initially led to the lock-step sequence has been disrupted and the new timing relationship is unlikely to initiate another lock-step sequence. The machine cycle that generates the START signal and STOP signal is repeated for as long as the AMC 115 is operating.

It should be noted that the advantages of the present invention, although discussed in the context of the foregoing pseudo-randomly generated pulses, may alternatively be implemented in any embodiment capable of perturbing a lock-step sequence of memory requests received from a number of processors. For instance, a suitable "perturbing" pulse (broadly referred to herein as a "memory request") may be generated to terminate such lock-step sequences in response to, based upon, derived from, or established upon, any suitably applied mathematical theory, whether randomly generated or not, including statistics, stochastic modeling, chaos theory, standard deviation, probability theory, permutations and combinations, frequency, or the like.

Although the present invention and its advantages have been described in detail, those skilled in the art should understand that various changes, substitutions and alterations herein may be made without departing from the spirit and scope of the invention in its broadest form.

What is claimed is:

1. For use in a processing system containing a plurality of processors coupled to a main memory by a first common bus, a control circuit for breaking a lock-step sequence of memory requests received from said processors, said control circuit comprising:
    a memory request generator coupled to said first common bus for generating an additional memory request separate from the memory requests of the lock-step sequence, the additional memory request having a higher service priority than the memory requests of said lock-step sequence to perturb a timing of said lock-step sequence of memory requests;
    a plurality of I/O devices coupled to said main memory by a second common bus and said memory request generator is adapted to be coupled to said second common bus and further generates at least one memory request having a higher service priority than memory requests of a lock-step sequence of said I/O devices on said second common bus operable to terminate said lock-step sequence of memory requests received from said I/O devices; and
    wherein the additional memory request on said first common bus and said at least one memory request on said second common bus are generated at different times.

2. The control circuit set forth in claim 1 wherein the additional memory request is generated pseudo-randomly.

3. The control circuit set forth in claim 1 wherein a duration of the additional memory request is generated pseudorandomly.

4. The control circuit set forth in claim 1 wherein said at least one memory request on said second common bus is generated pseudo-randomly.

5. The control circuit set forth in claim 1 wherein a duration of said at least one memory request on said second common bus is generated pseudo-randomly.

6. The control circuit set forth in claim 1, wherein the additional memory request is generated independently and infrequently, regardless whether the lock-step sequence of memory requests exists.

7. For use in a processing system containing a plurality of processors coupled to a main memory by a first common bus, a control circuit for breaking a lock-step sequence of memory requests received from said processors, said control circuit comprising:
    a memory request generator coupled to said first common bus for generating an additional memory request separate from the memory requests of the lock-step sequence, the additional memory request having a higher service priority than the memory requests of said lock-step sequence to perturb a timing of said lock-step sequence of memory requests;
    a plurality of I/O devices coupled to said main memory by a second common bus and said memory request generator is adapted to be coupled to said second common bus and further generates at least one memory request having a higher service priority than memory requests of a lock-step sequence of said I/O devices on said second common bus operable to terminate said lock-step sequence of memory requests received from said I/O devices; and
    wherein the additional memory request on said first common bus and said at least one memory request on said second common bus are generated simultaneously.

8. A processing system comprising:
    a plurality of processors;
    a main memory;
    a memory control device coupled to said plurality of processors by a first common bus and to said main memory to receive memory requests from said plurality of processors and to transfer data between said plurality of processors and said main memory;
    a control circuit to break a lock-step sequence of memory request received from said processors, said control circuit comprising a memory request generator coupled to said first common bus for generating an additional memory request separate from the memory requests of the lock-step sequence, the additional memory request having a higher service priority than the memory requests of said lock-step sequence to perturb a timing of said lock-step sequence of memory requests;

a plurality of I/O devices coupled to said memory control device by a second common bus, wherein said memory request generator is coupled to said second common bus and further generates at least one memory request having a higher service priority than memory requests of a lock-step sequence of said I/O devices on said second common bus operable to terminate said lock-step sequence of memory requests received from said I/O devices; and wherein the additional memory request on said first common bus and said at least one memory request on said second common bus are generated at different times.

9. The processing system set forth in claim 8 wherein the additional memory request is generated pseudo-randomly.

10. The processing system set forth in claim 8 wherein a duration of the additional memory request is generated pseudorandomly.

11. The processing system set forth in claim 8 wherein said at least one memory request on said second common bus is generated pseudo-randomly.

12. The processing system set forth in claim 8 wherein a duration of said at least one memory request on said second common bus is generated pseudo-randomly.

13. The processing system set forth in claim 8, wherein the additional memory request is generated independently and infrequently, regardless whether the lock-step sequence of memory requests exists.

14. A processing system comprising:

a plurality of processors;

a main memory;

a memory control device coupled to said plurality of processors by a first common bus and to said main memory to receive memory requests from said plurality of processors and to transfer data between said plurality of processors and said main memory;

a control circuit to break a lock-step sequence of memory request received from said processors, said control circuit comprising a memory request generator coupled to said first common bus for generating an additional memory request separate from the memory requests of the lock-step sequence, the additional memory request having a higher service priority than the memory requests of said lock-step sequence to perturb a timing of said lock-step sequence of memory requests;

a plurality of I/O devices coupled to said memory control device by a second common bus, wherein said memory request generator is coupled to said second common bus and further generates at least one memory request having a higher service priority than memory requests of a lock-step sequence of said I/O devices on said second common bus operable to terminate said lock-step sequence of memory requests received from said I/O devices; and wherein the additional memory request on said first common bus and said at least one memory request on said second common bus are generated simultaneously.

15. In a processing system containing a plurality of processors coupled to a main memory by a first common bus, a method of terminating a lock-step sequence of memory requests received from the processors, the method comprising:

generating, by a memory request generator coupled to said first common bus, an additional memory request separate from the memory requests of the lock-step sequence, the additional memory request having a higher service priority than the memory requests of said lock-step sequence to perturb a timing of said lock-step sequence of memory requests;

generating at least one memory request having a higher service priority than memory requests of a lock-step sequence of a plurality of I/O devices on a second common bus, the at least one memory request on the second bus operable to terminate a second lock-step sequence of memory requests received from the I/O devices; and wherein the additional memory request on said first common bus and said at least one memory request on said second common bus are generated at different times.

16. The method set forth in claim 15 wherein the at least one memory request is generated pseudo-randomly.

17. The method set forth in claim 15 wherein a duration of the at least one memory request is generated pseudo-randomly.

18. The method set forth in claim 15, wherein the additional memory request is generated independently and infrequently, regardless whether the lock-step sequence of memory requests exists.

19. In a processing system containing a plurality of processors coupled to a main memory by a first common bus, a method of terminating a lock-step sequence of memory requests received from the processors, the method comprising:

generating, by a memory request generator coupled to said first common bus, an additional memory request separate from the memory requests of the lock-step sequence, the additional memory request having a higher service priority than the memory requests of said lock-step sequence to perturb a timing of said lock-step sequence of memory requests;

generating at least one memory request having a higher service priority than memory requests of a lock-step sequence of a plurality of I/O devices on a second common bus, the at least one memory request on the second bus operable to terminate a second lock-step sequence of memory requests received from the I/O devices; and wherein the additional memory request on said first common bus and said at least one memory request on said second common bus are generated simultaneously.

* * * * *

UNITED STATES PATENT AND TRADEMARK OFFICE
CERTIFICATE OF CORRECTION

PATENT NO. : 6,560,682 B1  Page 1 of 1
DATED : May 6, 2003
INVENTOR(S) : Miller et al.

It is certified that error appears in the above-identified patent and that said Letters Patent is hereby corrected as shown below:

Column 4,
Line 67, delete "100b", insert -- 110b --.

Signed and Sealed this

Twenty-fifth Day of November, 2003

JAMES E. ROGAN
*Director of the United States Patent and Trademark Office*